United States Patent
Ikenaka et al.

(10) Patent No.: US 7,508,745 B2
(45) Date of Patent: *Mar. 24, 2009

(54) OPTICAL ELEMENT HAVING A REFRACTIVE FUNCTION AND AN OPTICAL PATH DIFFERENCE PROVIDING FUNCTION

(75) Inventors: Kiyono Ikenaka, Hachioji (JP); Kohei Ota, Hachioji (JP); Yuichi Atarashi, Hino (JP)

(73) Assignee: Konica Corporation, Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 10/263,824

(22) Filed: Oct. 4, 2002

(65) Prior Publication Data

US 2003/0076595 A1   Apr. 24, 2003

(30) Foreign Application Priority Data

Oct. 11, 2001   (JP) .............................. 2001-313866

(51) Int. Cl.
*G11B 7/00* (2006.01)

(52) U.S. Cl. .............................. 369/112.08; 369/112.07

(58) Field of Classification Search .............. 369/112.1, 369/112.25, 112.15; 359/719, 743, 571; *G11B 7/00, G11B 7/135; G92B 3/08; G02B 3/08, 21/02, G02B 5/18*

See application file for complete search history.

(56) References Cited

U.S. PATENT DOCUMENTS 6,088,322 A * 7/2000 Broome et al. ......... 369/112.26
6,118,594 A * 9/2000 Maruyama .................. 359/719
6,545,807 B2 * 4/2003 Maruyama .................. 359/565
6,594,222 B2 * 7/2003 Maruyama ............. 369/112.26
6,624,941 B2 * 9/2003 Takeuchi et al. ............. 359/566
6,624,942 B2 * 9/2003 Maruyama et al. .......... 359/566
6,728,042 B2 * 4/2004 Ota et al. ..................... 359/637

(Continued)

FOREIGN PATENT DOCUMENTS

DE   10065452 A1   7/2001

(Continued)

OTHER PUBLICATIONS

Japanese Office Action dated Mar. 7, 2005, in counterpart Japanese application No. 2001-313866.

*Primary Examiner*—Joseph H Feild
*Assistant Examiner*—Christopher R Lamb
(74) *Attorney, Agent, or Firm*—Finnegan, Henderson, Farabow, Garrett & Dunner, L.L.P.

(57) ABSTRACT

An optical system has an optical functional surface including a common region used for conducting information recording and/or reproducing for both of a first optical information recording medium and a second optical information recording medium. The common region comprises a refractive surface of an imaginary basic aspherical surface and a optical path difference providing structure in which plural ring-shapes zones are separated around the center of an optical axis and neighboring ring-shaped zones are displaced to each other in a direction of an optical axis so as to cause an optical path difference obtained by multiplying a predetermined wavelength $\lambda s$ ($\lambda 1 < \lambda s < \lambda 2$) with almost an integer. The refractive surface of the imaginary basic aspherical surface is structured such that a spherical aberration becomes under on the first information recording medium and a spherical aberration becomes over on the second information recording medium.

7 Claims, 19 Drawing Sheets

U.S. PATENT DOCUMENTS

| | | | |
|---|---|---|---|
| 6,747,812 B2 * | 6/2004 | Ota et al. .................... 359/719 |
| 6,760,295 B1 | 7/2004 | Maruyama | |
| 6,781,943 B2 | 8/2004 | Saito | |
| 6,870,805 B1 * | 3/2005 | Arai et al. .............. 369/112.07 |
| 6,930,973 B2 * | 8/2005 | Hendriks et al. ....... 369/112.06 |
| 7,190,658 B2 * | 3/2007 | Ikenaka ................. 369/112.13 |
| 2001/0055156 A1 | 12/2001 | Maruyama | |

FOREIGN PATENT DOCUMENTS

| | | |
|---|---|---|
| EP | 0 881 634 A1 | 12/1998 |
| EP | 1 100 078 A2 | 5/2001 |
| EP | 1 187 117 A2 | 3/2002 |
| JP | 10-334504 | 12/1998 |
| JP | 11-002759 | 1/1999 |
| JP | 11-016190 | 1/1999 |
| JP | 11-016194 | 1/1999 |
| JP | 2000-260056 | 9/2000 |
| JP | 2001-051192 | 2/2001 |
| JP | 2001-229567 | 8/2001 |
| WO | WO 99/57720 | 11/1999 |
| WO | WO 00 41173 A | 7/2000 |
| WO | WO 02/41303 A2 | 5/2002 |

* cited by examiner

FIG. 1
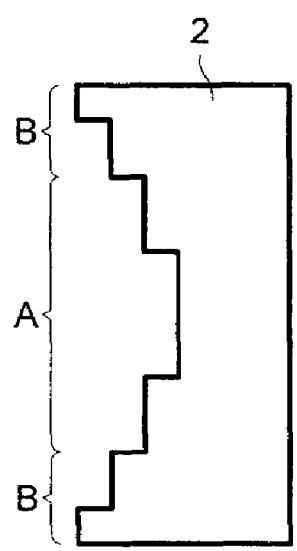
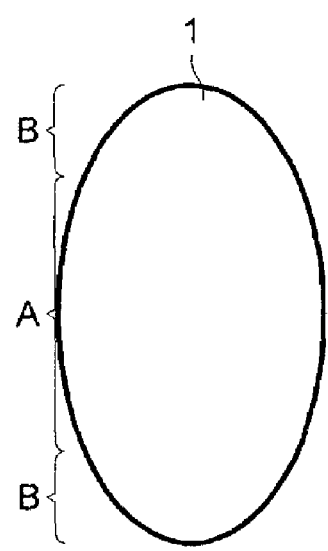

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

LONGITUDINAL SPHERICAL ABERRATION DIAGRAM

RADIUS OF INNER CIRCLE AND RADIUS OF OUTER CIRCLE OF EACH
RING-SHAPED ZONE AND DISPLACEMENT AMOUNT IN OPTICAL AXIS DIRECTION

| RING-SHAPED ZONE NO. | RADIUS OF INNER CIRCLE (mm) | RADIUS OF OUTER CIRCLE (mm) | AMOUNT OF DISPLACEMENT FROM THE FIRST RING-SHAPED ZONE IN OPTICAL AXIS DIRECTION ($\mu$m) |
|---|---|---|---|
| 1 | 0.000 | 0.809 | 0.00 |
| 2 | 0.809 | 0.974 | -1.37 |
| 3 | 0.974 | 1.084 | -2.76 |
| 4 | 1.084 | 1.167 | -4.17 |
| 5 | 1.167 | 1.235 | -5.58 |
| 6 | 1.235 | 1.293 | -7.01 |
| 7 | 1.293 | 1.343 | -8.45 |
| 8 | 1.343 | 1.387 | -9.90 |
| 9 | 1.387 | 1.428 | -11.36 |
| 10 | 1.428 | 1.464 | -12.82 |
| 11 | 1.464 | 1.498 | -14.29 |
| 12 | 1.498 | 1.530 | -15.77 |
| 13 | 1.530 | 1.560 | -17.26 |
| 14 | 1.560 | 1.589 | -18.75 |
| 15 | 1.589 | 4.032 | -46.98 |

FIG. 12

| SURFACE No. | R | d1 | d2 | n1 | n2 |
|---|---|---|---|---|---|
| OBJECT POINT | DESCRIBED SEPARATELY | ∞ | ∞ | | |
| 1 (ASPHERIC SURFACE) | | 2.2 | 2.2 | 1.5409 | 1.5372 |
| 2 (ASPHERIC SURFACE) | -8.225 | 1.75 | 1.39 | | |
| 3 (COVER GLASS) | ∞ | 0.6 | 1.2 | 1.58 | 1.57 |
| 4 | ∞ | | | | |

SUFFIX "1" REPRESENT $\lambda 1 = 655$ nm AND SUFFIX "2" REPRESENTS $\lambda 2 = 785$ nm.

FIG. 13

$$X = \frac{(h^2/R)}{1+\sqrt{1-(1+K)(h/R)^2}} + \sum_{i=i}^{10} A_i h^i$$

FIG. 14

| FIRST SURFACE | RING-SHAPED ZONE No.1 - 12  $0 \leq h \leq 1.589$ | $r = 2.1134$ <br> $K = 4.0221 \times 10^{-1}$ <br> $A4 = -1.1603 \times 10^{-2}$ <br> $A6 = 1.3063 \times 10^{-3}$ <br> $A8 = -8.6254 \times 10^{-3}$ <br> $A10 = 8.1442 \times 10^{-3}$ <br> $A12 = -4.7446 \times 10^{-3}$ <br> $A14 = 1.4115 \times 10^{-3}$ <br> $A16 = -1.8079 \times 10^{-4}$ |
|---|---|---|
| | RING-SHAPED ZONE No. 13 $1.58 \leq h \leq 2.016$ | $r = 1.6194$ <br> $K = -2.8040$ <br> $A4 = 1.6258 \times 10^{-2}$ <br> $A6 = -1.5306 \times 10^{-4}$ <br> $A8 = 7.4561 \times 10^{-6}$ <br> $A10 = 2.1101 \times 10^{-4}$ <br> $A12 = -7.0930 \times 10^{-5}$ <br> $A14 = 6.3020 \times 10^{-6}$ |
| SECOND SURFACE | | $r = -8.2248$ <br> $K = 2.8703$ <br> $A4 = 2.2701 \times 10^{-2}$ <br> $A6 = -1.2631 \times 10^{-2}$ <br> $A8 = 5.8438 \times 10^{-3}$ <br> $A10 = -1.6771 \times 10^{-3}$ <br> $A12 = 2.4271 \times 10^{-4}$ <br> $A14 = -1.2458 \times 10^{-5}$ |

COMMON AREA CD LONGITUDINAL SPHERICAL ABERRATION DIAGRAM
(BASE ASPHERIC SURFACE)

OPTICAL ELEMENT HAVING A REFRACTIVE FUNCTION AND AN OPTICAL PATH DIFFERENCE PROVIDING FUNCTION

DETAILED DESCRIPTION OF THE INVENTION

The present invention relates to an objective lens used in an optical pickup device and the optical pickup device, and in particular, to an objective lens for an optical pickup device capable of conducting recording and/or reproducing of information for optical information recording media each being different in terms of a type and to the optical pickup device.

There has been developed an optical pickup device capable of conducting recording and/or reproducing of information for optical information recording media each being different in terms of a type such as DVD and CD, and it has been used for various uses. The optical pickup device like this is required to be capable of conducting appropriate reproducing and recording of information for both storage media (hereinafter referred to also as optical disks).

As a light source for the optical pickup device, in this case, a semiconductor laser is used, and the optical pickup device is usually provided with two light sources including one for DVD and the other for CD, because an optimum wavelength to be used for recording or reproducing of information DVD is 635 nm or about 650 nm, and an optimum wavelength to be used for recording or reproducing of information for CD is about 780 nm.

For recording and/or reproducing for optical information recording media (hereinafter referred to also as optical disks) of a CD type including CD-R, there are used an objective lens whose NA (numerical aperture) is 0.45-0.55 and an optical disk whose protective base board is 1.2 mm in thickness. On the other hand, for recording and/or reproducing for the optical disk information recording media (hereinafter referred to also as optical disks) of a DVD type, there are used an objective lens whose NA is 0.6-0.65 and an optical disk whose protective base board is 0.6 mm in thickness.

Therefore, when there is prepared a lens that is specialized in terms of a wavelength and a thickness of the protective base board on either one side, spherical aberration is produced for the protective base board thickness on the other side, which is a problem.

In order to solve this problem and to make appropriate recording and reproducing of information to be possible, there have been proposed various methods, and one of which is a phase correction method.

This method is roughly divided into a ring-shaped zone phase correction objective lens method and a phase control element method wherein an element in which a ring-shaped zone surface in a shape of plural concentric circles is formed on the base board, separately from the objective lens.

The example of the ring-shaped zone phase correction objective lens method is described in, for example, TOKKAIHEI Nos. 11-2759 and 11-16190.

What is described in TOKKAIHEI No. 11-2759 represents an occasion wherein the basic surface shape of the objective lens is established so that it may be optimum in recording and reproducing for DVD as stated above, and correction is made by the phase correction method for recording and reproducing for CD. In a word, steps in a form of ring-shaped zones are formed on the surface of the objective lens that is designed to have the minimum wave-front aberration in the DVD systems, and thereby, wave-front aberration is reduced in CD systems while an increase of wave-front aberration in DVD systems is controlled.

Since the phase distribution is hardly changed by the phase control element for DVD wavelength in this technology, RMS wave-front aberration maintains a value of the objective lens designed to be optimum for DVD systems, and acts to reduce RMS wave-front aberration for CD systems, which is effective for the DVD systems wherein the recording and reproducing capacities are sensitive to the wave-front aberration.

Contrary to the foregoing, TOKKAIHEI No. 10-334504 discloses an occasion wherein the basic optical performance of the objective lens is set so that it may be optimum in recording and reproducing for CD, and correction by means of the phase correction method is conducted for recording and reproducing for DVD.

In the foregoing, RMS (Root Mean Square) wave-front aberration of each of them is improved for both recording and reproducing for DVD and recording and reproducing for CD.

In the case of the ring-shaped zone phase correction objective lens, TOKKAIHEI No. 11-16190, for example, discloses an occasion wherein there is assumed an optical disk having a base board whose thickness is an in-between of those for CD and DVD, a basic surface form of the objective lens is established so that it may be optimum for recording and reproducing for the optical disk mentioned above, and RMS (Root Mean Square) wave-front aberration for each of DVD and CD is further conducted by the phase correction method.

Further, TOKKAI No. 2001-51192 discloses a technology wherein RMS (Root Mean Square) wave-front aberration is made to be small by changing an amount of a step of each ring-shaped zone and a surface form, and thereby, a light-converging position of light is made to be one point.

Each technology stated above is one wherein the surface form of the objective lens is designed so that a beam aberration may be optimum when light is converged on an optical disk such as DVD, CD or the optical disk having a base board whose thickness is an in-between of those for CD and DVD, and as a correction technology for other optical disks to be used, the phase is corrected by sliding a part of the lens surface in the optical axis direction and thereby by generating a phase difference, or by placing a phase difference plate in the optical path.

For the pickup lens, it is necessary that RMS wave-front aberration is excellent for recording and reproducing information from the optical disk surely, and focus error signal characteristics and focus offset are excellent, for converging light at a pit position of the optical disk. Focus error signal characteristics and focus offset are characteristics caused by ray aberration of the pickup lens.

Under the condition that the foresaid performance is necessary, in each of the technologies mentioned above, RMS wave-front aberration can be reduced for both DVD and CD, by shifting a part of the lens surface in the optical axis direction. On the other hand, ray aberration cannot correct DVD and CD simultaneously.

With the foregoing as a background, the invention is one realized by finding out the technology to satisfy RMS wave-front aberration and ray aberration for both DVD and CD while using the same method of shifting a part of the lens surface in the optical axis direction in the area where an optical element including an objective lens is used for both of DVD and CD.

The invention is one realized by finding out that appropriate optical performance can be attained for each of DVD and CD, if an area used for CD and DVD among optical functional surfaces of the optical element including the objective lens is aimed at, and if spherical aberration is stabilized in this area and macroscopic wave-front is corrected.

SUMMARY OF THE INVENTION

An object of the invention is to provide a technology to attain interchangeability for DVD and CD by giving a different optical path difference for each wavelength selectively, and by making a ray of light having each wavelength to be in the state of appropriate spherical aberration.

Item (1)

An optical system of an optical pickup device capable of conducting recording and/or reproducing of information by making a light flux emitted from a first light source having wavelength $\lambda 1$ to be converged on an information recording surface of a first optical information recording medium through a protective base board having thickness t1, and by making a light flux emitted from a second light source having wavelength $\lambda 2$ ($\lambda 1 < \lambda 2$) to be converged on an information recording surface of a second optical information recording medium through a protective base board having thickness t2 (t1<t2), wherein there is provided a refracting function which makes spherical aberration to be under-corrected on the first optical information recording medium and makes spherical aberration to be overcorrected on the second optical information recording medium, for a ray of light passing through an area used in recording and/or reproducing of information for both the first optical information recording medium and the second optical information recording medium, and adjoining ring-shaped zones in plural ring-shaped zones divided to have the center on the optical axis are formed to be displaced each other in the optical axis direction so that an optical path difference that is almost a multiple of an integer of prescribed wavelength $\lambda s$ ($\lambda 1 < \lambda s < \lambda 2$) may be generated, and there is provided an optical path difference giving function (a function of giving an optical path difference) that is formed so that an optical path of light may become longer gradually as an entrance position of the light to the optical element moves toward the periphery from the optical axis.

Item (2)

An optical system of an optical pickup device capable of conducting recording and/or reproducing of information by making a light flux emitted from a first light source having wavelength $\lambda 1$ to be converged on an information recording surface of a first optical information recording medium through a protective base board having thickness t1, and by making a light flux emitted from a second light source having wavelength $\lambda 2$ ($\lambda 1 < \lambda 2$) to be converged on an information recording surface of a second optical information recording medium through a protective base board having thickness t2 (t1<t2), wherein there is provided a refracting function which makes spherical aberration to be overcorrected or to be optimum on the first optical information recording medium, and adjoining ring-shaped zones in plural ring-shaped zones divided to have the center on the optical axis are formed to be displaced each other in the optical axis direction so that an optical path difference that is almost a multiple of an integer of prescribed wavelength $\lambda s$ ($\lambda 1 = \lambda s$) may be generated, and there is provided an optical path difference giving function that is formed so that an optical path of light may become longer gradually as an entrance position of the light to the optical element moves toward the periphery from the optical axis.

Item (3)

An optical system of an optical pickup device capable of conducting recording and/or reproducing of information by making a light flux emitted from a first light source having wavelength $\lambda 1$ to be converged on an information recording surface of a first optical information recording medium through a protective base board having thickness t1, and by making a light flux emitted from a second light source having wavelength $\lambda 2$ ($\lambda 1 < \lambda 2$) to be converged on an information recording surface of a second optical information recording medium through a protective base board having thickness t2 (t1<t2), wherein there is provided a refracting function which makes spherical aberration to be under-corrected on the first optical information recording medium and makes spherical aberration to be overcorrected or to be optimum on the second optical information recording medium, for a ray of light passing through an area used in recording and/or reproducing of information for both the first optical information recording medium and the second optical information recording medium, and adjoining ring-shaped zones in plural ring-shaped zones divided to have the center on the optical axis are formed to be displaced each other in the optical axis direction so that an optical path difference that is almost a multiple of an integer of prescribed wavelength $\lambda s$ ($\lambda s = \lambda 2$) may be generated, and there is provided an optical path difference giving function that is formed so that an optical path of light may become longer gradually as an entrance position of the light to the optical element moves toward the periphery from the optical axis.

Item (4)

The optical system of an optical pickup device according to the Items (1)-(3), wherein the optical path difference giving function makes spherical aberration on the first optical information recording medium and that on the second optical information recording medium to be optimum.

Item (5)

The optical system of an optical pickup device according to the Item (1), wherein the refracting function makes the light emitted from the first light source that passes the position farthest from the optical axis in the area used for recording and/or reproducing of information for both the first optical information recording medium and the second optical information recording medium to intersect with the optical axis in the area within 0.013 mm from the position where a paraxial ray intersects with the optical axis.

Item (6)

The optical system of an optical pickup device according to the Item (2), wherein the refracting function makes the light emitted from the first light source that passes the position farthest from the optical axis in the area used for recording and/or reproducing of information for both the first optical information recording medium and the second optical information recording medium to intersect with the optical axis in the area within 0.020 mm from the position where a paraxial ray intersects with the optical axis.

Item (7)

The optical system of an optical pickup device according to the Item (3), wherein the refracting function makes the light emitted from the first light source that passes the position farthest from the optical axis in the area used for recording and/or reproducing of information for both the first optical information recording medium and the second optical information recording medium to intersect with the optical axis in the area within 0.030 mm from the position where a paraxial ray intersects with the optical axis.

Item (8)

The optical system of an optical pickup device according to the Items (1)-(7), wherein the optical system is composed of an optical element having the aforementioned refracting function and an optical element having the aforementioned optical path difference giving function that is provided separately from the optical element stated above.

Item (9)

The optical system of an optical pickup device according to the Items (1)-(7), wherein the optical system includes an optical element provided in one element with the refracting function and the optical path difference giving function.

Item (10)

The optical system of an optical pickup device according to the Items (1)-(9), wherein the number of ring-shaped zones of the aforementioned ring-shaped zones in the area used for recording and/or reproducing of information for both the first optical information recording medium and the second optical information recording medium is within a range of 3-7.

Item (11)

The optical system of an optical pickup device according to the Items (1)-(10), wherein the optical path difference giving function of the area used for recording and/reproducing information in both the first optical information recording medium and the second optical information recording medium is composed of a diffractive structure.

Item (12)

The optical system of an optical pickup device according to the Item (11), wherein the light flux emitted from the first light source in which spherical aberration is made to be undercorrected by the refracting function and the light flux emitted from the second light source in which spherical aberration is made to be overcorrected by the refracting function are made to be aplanatic by the diffractive structure.

Item (13)

The optical system of an optical pickup device according to the Item (11), wherein the light flux emitted from the second light source in which spherical aberration is made to be overcorrected by the refracting function is made to be aplanatic by the diffractive structure.

Item (14)

The optical system of an optical pickup device according to the Item (11), wherein the light flux emitted from the first light source in which spherical aberration is made to be undercorrected by the refracting function is made to be aplanatic by the diffractive structure.

Item (15)

The optical system of an optical pickup device according to the Items (11)-(14), wherein the diffractive structure is formed so that optical path length $\Phi(h)$ expressed by the following the expression of Numeral 5, $$\phi(h) = \left(\sum_{i=1} C_{2i} h^{2i}\right) \times m \times \lambda = (C_2 h^2 + C_4 h^4 + C_6 h^6 + \cdots) \times m \times \lambda \quad \text{Numeral 5}$$

wherein m represents a diffraction order, $\lambda$ represents a wavelength to be used and Ci represents constants at least one of them satisfies $C_i \neq 0$, may be added for the light passing through the ring-shaped zone whose vertical distance from the optical axis is h.

Item (16)

The optical system of an optical pickup device according to the Items (11)-(15), wherein the number of ring-shaped zones of the diffractive structure is within a range of 7-100.

Item (17)

The optical system of an optical pickup device according to the Items (11)-(16), wherein the number of ring-shaped zones of the diffractive structure is within a range of 11-30.

Item (18)

The optical system of an optical pickup device according to the Items (1)-(17), wherein a refracting surface is formed on an area used for recording and/or reproducing of information for the first optical information recording medium that is positioned on the peripheral portion of an area used for recording and/or reproducing for both the first optical information recording medium an the second optical information recording medium, among optical functional surfaces of the optical element included in the optical system of the optical pickup device.

Item (19)

The optical system of an optical pickup device according to the Items (1)-(18), wherein the second refracting function which makes spherical aberration to be overcorrected or optimum on the first optical information recording medium is provided to an area used for recording and/or reproducing of information for the first optical information recording medium that is positioned on the peripheral portion of an area used for recording and/or reproducing for both the first optical information recording medium an the second optical information recording medium, among optical functional surfaces of the optical element included in the optical system of the optical pickup device, and adjoining ring-shaped zones in plural ring-shaped zones divided to have the center on the optical axis are formed to be displaced each other in the optical axis direction so that an optical path difference that is almost a multiple of an integer of the aforementioned wavelength $\lambda 1$ may be generated, and there is provided a second optical path difference giving function that is formed so that an optical path of light may become longer gradually as a position of the light moves toward the periphery from the optical axis.

Item (20)

The optical system of an optical pickup device according to the Item (19), wherein the second optical path difference giving function is composed of a diffractive structure.

Item (21)

The optical system of an optical pickup device according to the Item (20), wherein the diffractive structure that constitutes the second optical path difference giving function makes the light flux emitted from the second light source whose spherical aberration is made to be overcorrected by the second refracting function to continue to be overcorrected.

Item (22)

The optical system of an optical pickup device according to the Items (20)-(21), wherein the diffractive structure that constitutes the second optical path difference giving function is formed so that optical path length $\Phi(h)$ expressed by the following the expression of Numeral 6, $$\phi(h) = \left(\sum_{i=1} C_{2i} h^{2i}\right) \times m \times \lambda = (C_2 h^2 + C_4 h^4 + C_6 h^6 + \cdots) \times m \times \lambda$$

Numeral 6 wherein m represents a diffraction order, λ represents a wavelength to be used and Ci represents constants at least one of them satisfies Ci≠0, may be added for the light passing through the ring-shaped zone whose vertical distance from the optical axis is h.

Item (23)

The optical system of an optical pickup device according to the Items (20)-(22), wherein the number of ring-shaped zones of the diffractive structure that constitutes the second optical path difference giving function is within a range of 7-100.

Item (24)

The optical system of an optical pickup device according to the Items (20)-(23), wherein the number of ring-shaped zones of the diffractive structure that constitutes the second optical path difference giving function is within a range of 11-30.

Item (25)

An optical system of an optical pickup device capable of conducting recording and/or reproducing of information by making a light flux emitted from a first light source having wavelength λ1 to be converged on an information recording surface of a first optical information recording medium through a protective base board having thickness t1, and by making a light flux emitted from a second light source having wavelength λ2 (λ1<λ2) to be converged on an information recording surface of a second optical information recording medium through a protective base board having thickness t2 (t1<t2), wherein an area used for recording and/or reproducing of information for the first optical information recording medium and the second optical information recording medium, among optical functional surfaces of the optical system has a refracting function based on a virtual base aspheric surface and has an optical path difference giving structure (a structure giving an optical path difference) formed by displacing in the optical axis direction each other so that adjoining ring-shaped zones in plural ring-shaped zones divided to have the center on the optical axis may generate an optical path difference that is almost a multiple of an integer of prescribed wavelength λs (λ1<λs<λ2), and the virtual base aspheric surface is formed so that spherical aberration may be under-corrected on the first optical information recording medium and may be overcorrected on the second optical information recording medium.

Item (26)

An optical system of an optical pickup device capable of conducting recording and/or reproducing of information by making a light flux emitted from a first light source having wavelength λ1 to be converged on an information recording surface of a first optical information recording medium through a protective base board having thickness t1, and by making a light flux emitted from a second light source having wavelength λ2 (λ1<λ2) to be converged on an information recording surface of a second optical information recording medium through a protective base board having thickness t2 (t1<t2), wherein an area used for recording and/or reproducing of information for the first optical information recording medium and the second optical information recording medium, among optical functional surfaces of the optical element used for the optical pickup device has a refracting function based on a virtual base aspheric surface and has an optical path difference giving structure formed by displacing in the optical axis direction each other so that adjoining ring-shaped zones in plural ring-shaped zones divided to have the center on the optical axis may generate an optical path difference that is almost a multiple of an integer of prescribed wavelength λs (λs=λ1), and the virtual base aspheric surface (virtual base aspheric surface refracting surface) is formed so that spherical aberration may be overcorrected or optimum on the first optical information recording medium.

Item (27)

An optical system of an optical pickup device capable of conducting recording and/or reproducing of information by making a light flux emitted from a first light source having wavelength λ1 to be converged on an information recording surface of a first optical information recording medium through a protective base board having thickness t1, and by making a light flux emitted from a second light source having wavelength λ2 (λ1<λ2) to be converged on an information recording surface of a second optical information recording medium through a protective base board having thickness t2 (t1<t2), wherein an area used for recording and/or reproducing of information for both the first optical information recording medium among optical functional surfaces of the optical element used for the optical pickup device has a refracting function based on a virtual base aspheric surface and has an optical path difference giving structure formed by displacing in the optical axis direction each other so that adjoining ring-shaped zones in plural ring-shaped zones divided to have the center on the optical axis may generate an optical path difference that is almost a multiple of an integer of prescribed wavelength λs (λs=λ2), and the virtual base aspheric surface is formed so that spherical aberration may be under-corrected on the first optical information recording medium and may be overcorrected or optimum on the second optical information recording medium.

Item (28)

The optical system of an optical pickup device according to the Items (25)-(27), wherein the optical path difference giving structure makes spherical aberration on the first optical information recording medium and that on the second optical information recording medium to be optimum.

Item (29)

The optical system of an optical pickup device according to the Item (25), wherein the virtual base aspheric surface makes the light emitted from the first light source that passes the position farthest from the optical axis in the area used for recording and/or reproducing of information for both the first optical information recording medium and the second optical information recording medium to intersect with the optical axis in the area within 0.013 mm from the position where a paraxial ray intersects with the optical axis.

Item (30)

The optical system of an optical pickup device according to the Item (26), wherein the virtual base aspheric surface makes the light emitted from the first light source that passes the position farthest from the optical axis in the area used for recording and/or reproducing of information for both the first optical information recording medium and the second optical information recording medium to intersect with the optical axis in the area within 0.020 mm from the position where a paraxial ray intersects with the optical axis.

Item (31)

The optical system of an optical pickup device according to the Item (27), wherein the virtual base aspheric surface makes the light emitted from the first light source that passes the position farthest from the optical axis in the area used for recording and/or reproducing of information for both the first optical information recording medium and the second optical information recording medium to intersect with the optical axis in the area within 0.030 mm from the position where a paraxial ray intersects with the optical axis.

Item (32)

The optical system of an optical pickup device according to the Items (25)-(31), wherein the optical pickup device is composed of an optical element having a refracting function which is optically equivalent to that of the virtual base aspheric surface and of an optical element which is provided separately from the aforesaid optical element and has the optical path difference giving structure.

Item (33)

The optical system of an optical pickup device according to the Items (25)-(32), wherein the optical pickup device includes an optical element that is provided solidly with a refracting function which is optically equivalent to that of the virtual base aspheric surface and with the optical path difference giving structure.

Item (34)

The optical system of an optical pickup device according to the Items (25)-(33), wherein the number of ring-shaped zones is within a range of 3-7 in the optical path difference giving structure.

Item (35)

The optical system of an optical pickup device according to the Items (25)-(34), wherein the optical path difference giving structure is constituted with a diffractive structure.

Item (36)

The optical system of an optical pickup device according to the Item (35), wherein the light flux emitted from the first light source in which spherical aberration is made to be undercorrected by the refracting function equivalent optically to the virtual base aspheric surface and the light flux emitted from the second light source in which spherical aberration is made to be overcorrected by the refracting function are made to be aplanatic by the diffractive structure.

Item (37)

The optical system of an optical pickup device according to the Item (35), wherein the light flux emitted from the first light source in which spherical aberration is made to be undercorrected by the refracting function equivalent optically to the virtual base aspheric surface is made to be aplanatic by the diffractive structure.

Item (38)

The optical system of an optical pickup device according to the Item (35), wherein the light flux emitted from the second light source in which spherical aberration is made to be overcorrected by the refracting function equivalent optically to the virtual base aspheric surface is made to be aplanatic by the diffractive structure.

Item (39)

The optical system of an optical pickup device according to the Items (35)-(38), wherein the diffractive structure is formed so that optical path length $\Phi(h)$ expressed by the following the expression of Numeral 7, $$\phi(h) = \left(\sum_{i=1} C_{2i} h^{2i}\right) \times m \times \lambda = (C_2 h^2 + C_4 h^4 + C_6 h^6 + \cdots) \times m \times \lambda \qquad \text{Numeral 7}$$

wherein m represents diffraction order, $\lambda$ represents a wavelength to be used and Ci represents constants at least one of them satisfies Ci≠0, may be added for the light passing through the ring-shaped zone whose vertical distance from the optical axis is h.

Item (40)

The optical system of an optical pickup device according to the Items (35)-(39), wherein the number of ring-shaped zones of the diffractive structure is within a range of 7-100.

Item (41)

The optical system of an optical pickup device according to the Items (35)-(40), wherein the number of ring-shaped zones of the diffractive structure is within a range of 11-30.

Item (42)

The optical system of an optical pickup device according to the Items (25)-(41), wherein a refracting surface is formed on an area used for recording and/or reproducing of information for the first optical information recording medium that is positioned on the peripheral portion of an area used for recording and/or reproducing for both the first optical information recording medium an the second optical information recording medium, among optical functional surfaces of the optical element included in the optical pickup device.

Item (43)

The optical system of an optical pickup device according to the Items (25)-(42), wherein the second refracting function which makes spherical aberration to be overcorrected or optimum on the first optical information recording medium is provided to an area used for recording and/or reproducing of information for the first optical information recording medium that is positioned on the peripheral portion of an area used for recording and/or reproducing for both the first optical information recording medium an the second optical information recording medium, among optical functional surfaces of the optical element included in the optical system of the optical pickup device, and adjoining ring-shaped zones in plural ring-shaped zones divided to have the center on the optical axis are formed to be displaced each other in the optical axis direction so that an optical path difference that is almost a multiple of an integer of the aforementioned wavelength $\lambda 1$ may be generated, and there is provided a second optical path difference giving function that is formed so that an optical path of light may become longer gradually as an entrance position of the light to the optical element moves toward the periphery from the optical axis.

Item (44)

The optical system of an optical pickup device according to the Item (43), wherein the second optical path difference giving function is composed of a diffractive structure.

Item (45)

The optical system of an optical pickup device according to the Item (44), wherein the diffractive structure that constitutes the second optical path difference giving function makes the light flux emitted from the second light source whose spherical aberration is made to be overcorrected by the second refracting function to continue to be overcorrected.

Item (46)

The optical system of an optical pickup device according to the Items (44) and (45), wherein the diffractive structure that constitutes the second optical path difference giving function is formed so that optical path length Φ(h) expressed by the following the expression of Numeral 6, $$\phi(h) = \left(\sum_{i=1} C_{2i} h^{2i}\right) \times m \times \lambda = (C_2 h^2 + C_4 h^4 + C_6 h^6 + \cdots) \times m \times \lambda \qquad \text{Numeral 8}$$

wherein m represents diffraction order, λ represents a wavelength to be used and Ci represents constants at least one of them satisfies Ci≠0, may be added for the light passing through the ring-shaped zone whose vertical distance from the optical axis is h.

Item (47)

The optical system of an optical pickup device according to the Items (44)-(46), wherein the number of ring-shaped zones of the diffractive structure is within a range of 7-100.

Item (48)

The optical system of an optical pickup device according to the Items (44)-(47), wherein the number of ring-shaped zones of the diffractive structure is within a range of 11-30.

Item (49)

An optical system of an optical pickup device capable of conducting recording and/or reproducing of information by making a light flux emitted from a first light source having wavelength λ1 to be converged on an information recording surface of a first optical information recording medium through a protective base board having thickness t1, and by making a light flux emitted from a second light source having wavelength λ2 (λ1<λ2) to be converged on an information recording surface of a second optical information recording medium through a protective base board having thickness t2 (t1<t2), wherein an optical functional surface of the objective lens included in the optical pickup device is divided into plural ring-shaped zones whose centers are on the optical axis, adjoining ring-shaped zones are formed to be displaced in the optical axis direction so that an optical path difference that is a multiple of an integer of prescribed wavelength λs may be generated, and the ring-shaped zones in quantity of 7-100 are provided.

Item (50)

The optical system of an optical pickup device according to the Item (49), wherein the prescribed wavelength λs satisfies the relationship of λ1<λs<λ2.

Item (51)

The optical system of an optical element of an optical pickup device according to the Items (49) and (50), wherein the ring-shaped zones in quantity of 11-30 are provided.

Item (52)

The optical system of an optical element of an optical pickup device according to the Items (1)-(51), wherein the optical element is an objective optical element.

BRIEF DESCRIPTION OF THE DRAWINGS

FIG. 1 is a diagram showing illustratively the positional relationship between an optical element corresponding to the base aspheric surface (refracting surface) and a phase difference plate corresponding to an optical path difference giving structure (optical path difference giving function) in the optical system relating to the invention.

FIG. 12 shows an example of the first invention relating to the present invention, showing the lens data in the objective lens wherein a refracting function and an optical path difference giving function are provided to one element.

FIG. 13 shows an example of the first invention relating to the present invention, representing an expression for a form of aspheric surface coefficient showing a form of an objective lens in the occasion wherein a refracting function and an optical path difference giving function are provided to one element.

FIG. 14 shows an example of the first invention relating to the present invention, representing aspheric surface data showing a form of an objective lens in the occasion wherein a refracting function and an optical path difference giving function are provided to one element.

DETAILED DESCRIPTION OF THE PREFERRED EMBODIMENT

Embodiment of the Invention

Figure 2:
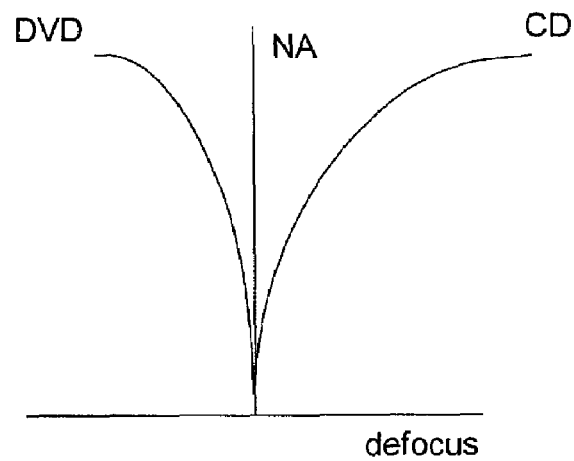
FIG. 2(a) shows illustratively longitudinal spherical aberration of the base aspheric surface (refracting surface) in the occasion wherein a refracting function and an optical path difference giving function are provided respectively on separate elements in the common area for DVD and CD in the first invention relating to the present invention.
FIG. 2(b) also shows illustratively longitudinal spherical aberration of the base aspheric surface (refracting surface) in the common area for DVD and CD in the occasion wherein a refracting function and an optical path difference giving function are provided on one element (one solid element) in the common area for DVD and CD in the first invention relating to the present invention.
Figure 2:
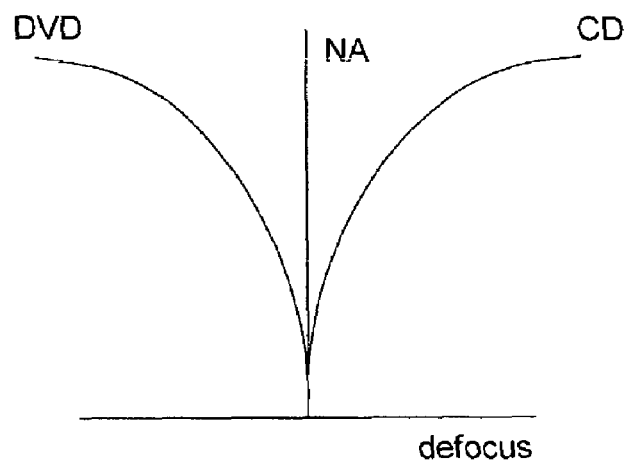
Figure 3:
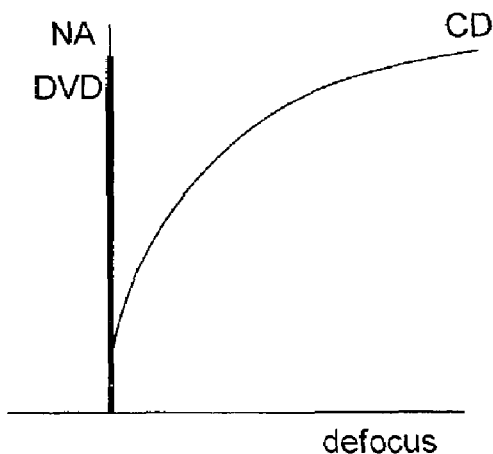
FIG. 3(a) shows illustratively longitudinal spherical aberration of the base aspheric surface (refracting surface, refractive interface) in the occasion wherein a refracting function and an optical path difference giving function are provided respectively on separate elements in the exclusive area for DVD that is common to the first-third inventions relating to the present invention.
FIG. 3(b) also shows illustratively longitudinal spherical aberration of the base aspheric surface (refracting surface) in the occasion wherein a refracting function and an optical path difference giving function are provided on one element in the exclusive area for DVD that is common to the first-third inventions relating to the present invention.
Figure 3:
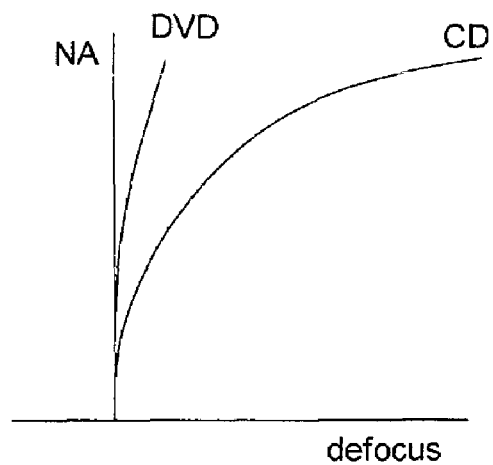
Figure 4:
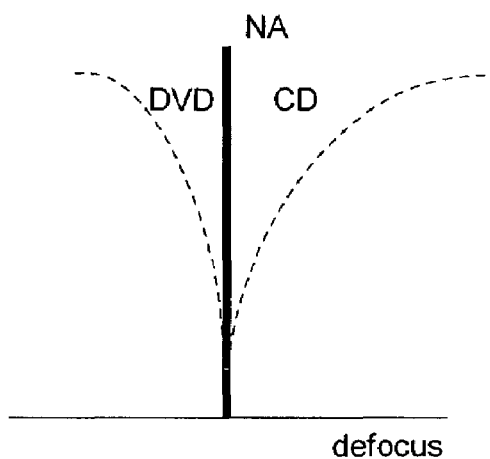
FIG. 4(a) shows illustratively how longitudinal spherical aberration is brought close to the aplanatic state by the optical path difference giving structure (optical path difference giving function) in the occasion wherein a refracting function and an optical path difference giving function are provided respectively on separate elements in the common area for DVD and CD of the first invention relating to the present invention.
FIG. 4(b) also shows illustratively how longitudinal spherical aberration is brought close to the aplanatic state by the optical path difference giving structure (optical path difference giving function) in the occasion wherein a refracting function and an optical path difference giving function are provided on one element for the common area for DVD and CD in the common area for DVD and CD of the first invention relating to the present invention.
Figure 4:
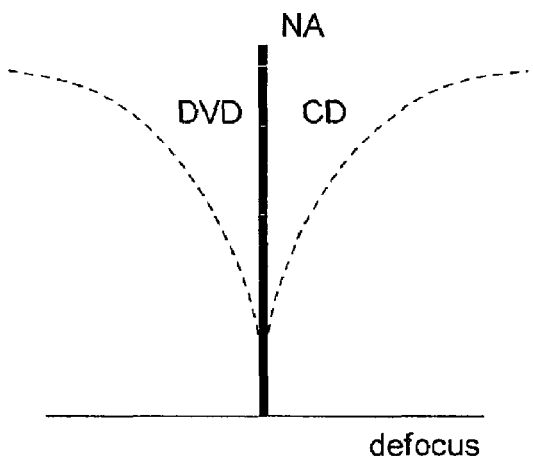

Referring to the drawings, there will be explained in detail the contents of the invention to which, however, the embodiment of the invention is not limited.

First Embodiment

An outline of optical functions of the first invention will be explained first, referring to FIG. 1 and FIGS. 2-4.

This is related to the invention of Item 1 or Item 25.

In FIG. 1, the numeral 1 represents a lens having a base aspheric surface that is a refracting surface, and 2 represents a phase difference plate having an optical path difference giving function, and both of them constitute an objective optical system of an optical pickup optical system capable of conducting recording and/or reproducing of information for both DVD and CD. With respect to an unillustrated light source, a light source with wavelength of 655 nm ($\lambda 1$) is used for conducting recording and/or reproducing of information for DVD, and a light source with wavelength of 785 nm (λ2) is used for conducting recording and/or reproducing of information for CD.

Among optical functional surfaces of lens 1, an area with NA (numerical aperture) of 0.45 whose center is on the optical axis is common area A used for conducting recording and/or reproducing of information for both DVD and CD, and an area with NA (numerical aperture) of 0.45-0.6 which is located on the peripheral portion of the aforementioned area is exclusive area B used for conducting recording and/or reproducing of information for only DVD.

On the lens 1 in the present example, there is formed a refractive interface (aspheric surface) which generates spherical aberration for both λ1 and λ2. To be concrete, there is formed a refracting surface which makes spherical aberration to be under-corrected for the light flux with wavelength λ1 that has passed through common area A, and makes spherical aberration to be overcorrected for the light flux with wavelength λ2 when a ray of light passes through individual lens 1 as shown in FIG. 2(a).

The phase difference plate 2 is divided into plural ring-shaped zones in a form of concentric circles whose centers are on the optical axis, and they are formed so that a thickness of a ring-shaped zone may be increased as the ring-shaped zone is located to be farther from the optical axis. A step between the ring-shaped zones is established to be in the length that generates no wave-front deviation, although a light flux passing through a certain ring-shaped zone and a light flux passing through a ring-shaped zone that adjoins the aforementioned ring-shaped zone generate an optical path difference that is almost a multiple of an integer of a prescribed wavelength. The prescribed wavelength in this case is set to the wavelength that is between λ1 and λ2.

It is therefore possible to arrange so that a ray of light wherein an envelope formed by connecting wave-fronts in the same phase is a new wave-front may become a converged light when a wave-front with wavelength λ1 enters the phase difference plate, while, a ray of light wherein an envelope formed by connecting wave-fronts in the same phase is a new wave-front may become a diverged light when a wave-front with wavelength λ2 enters the phase difference plate.

Thus, in the case of combining lens 1 and phase difference plate 2 to consider one optical system, when a light flux passing through common area A of lens 1 is noticed, a light flux with wavelength λ1 wherein spherical aberration is made to be under-corrected first by an aspheric surface is affected by phase difference plate 2 so that spherical aberration may be overcorrected, to be made to approach the aplanatic state, resulting in the optimum state of spherical aberration.

While, a light flux with wavelength λ2 wherein spherical aberration is made to be overcorrected first by an aspheric surface is affected by phase difference plate 2 so that spherical aberration may be under-corrected, to be made to approach the aplanatic state, resulting in the optimum state of spherical aberration, thus, a light flux with any wavelength can obtain appropriate spherical aberration.

Figure 10:
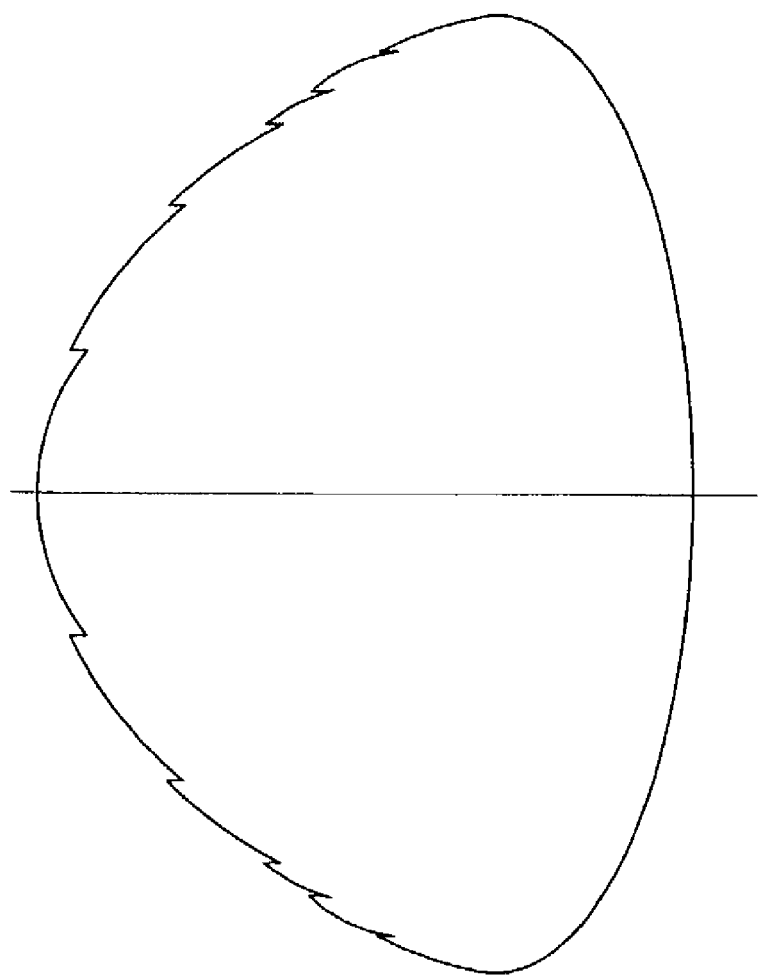
FIG. 10 shows an example of a form of an objective lens wherein a refracting function and an optical path difference giving function are provided in one element in the optical system relating to the present invention.

On the other hand, FIG. 10 shows a lens form in the case where the refracting function and the optical path difference giving function are united integrally to the objective lens. FIG. 2(b) shows spherical aberration caused by the refracting function of the objective lens for each of a light flux with wavelength of λ1 and a light flux with wavelength of λ2, while, FIG. 4(b) shows spherical aberration for each of a light flux with a final wavelength λ1 and a light flux with a final wavelength λ2 among light fluxes which have passed the objective lens. When a prescribed wavelength is one that is between λ1 and λ2, a form of a refracting surface which becomes aplanatic for both wavelength λ1 and wavelength λ2 is specified. It is preferable to design so that a ray of light with wavelength λ1 that passes through a boundary of the common area may intersect in an area within 0.013 mm from the position where a paraxial ray intersects with the optical axis.

If these optical functions are applied to an expression in Item 1, lens 1 has "refracting function", and phase difference plate 2 has "optical path difference giving function".

When the refracting function and the optical path difference giving function are united integrally to the objective lens, there is sometimes obtained one that is equipped with both optical functions as an individual optical element, by shifting a surface form of a base aspheric surface having a refracting function simply by a length of an optical path. When the numerical aperture is great, however, it is sometimes insignificant to simply move the surface in the optical axis direction, because a length of an optical path needs to be considered strictly. In this case, a form of the refracting surface is also changed so that the original refracting function and the optical path difference giving function may stand together.

It is preferable that the number of ring-shaped zones of common area A having the optical path difference giving function or the optical path difference giving structure is within a range of 3-7.

When the number of ring-shaped zones is less than the above-mentioned value, there is a fear that a beam aberration power is insufficient in particular, because a wave-front which has passed a phase difference plate cannot be approximated by an envelope formed by connecting wave-fronts on the same phase. When the number of ring-shaped zones is increased on the contrary, a width of a ring-shaped zone becomes smaller as the ring-shaped zone is farther from the optical axis, and it becomes difficult to form the ring-shaped zone.

This optical function may also be a diffractive structure. In the case of the diffractive structure, the light-converging efficiency of a spot is high, because a form of each surface of the ring-shaped zone is changed so that an optical path difference to be given may be changed continuously in all areas, while satisfying the aforementioned power.

To be concrete, in the case of the diffractive structure, when it is formed so that an optical path length expressed by the following expression of Numeral 9, $$\phi(h) = \left(\sum_{i=1} C_{2i} h^{2i}\right) \times m \times \lambda = (C_2 h^2 + C_4 h^4 + C_6 h^6 + \cdots) \times m \times \lambda \qquad \text{Numeral 9}$$

wherein m represents diffraction order, λ represents a wavelength to be used and Ci represents constants at least one of them satisfies Ci≠0, may be added, it is possible to generate the aplanatic state.

The number of ring-shaped zones in the case of forming the diffractive structure stated above is 7-100, and it preferably is 11-30.

When obtaining sufficiently the diffracting functions by the diffractive structure, less number of ring-shaped zones is insufficient, and when the number of ring-shaped zones is too great, accuracy is lowered and optical power cannot be attained.

Even in the exclusive area B, a refracting surface of lens 1 having the same effect as in the common area A is formed, and when phase difference plate 2 having the same effect as in the common area A is provided, the refracting surface becomes to be aplanatic for wavelength λ1 and wavelength λ2. In this case, a wavelength-selecting element that transmits the light with wavelength λ1 as it is and intercepts the light with wavelength λ2 is provided to be closer to the light source than the phase difference plate so that the light with wavelength λ2 may not enter, or the wavelength-selecting element is united integrally with the phase difference plate, thus, it is possible to satisfy the difference of NA between DVD and CD.

Figure 5:
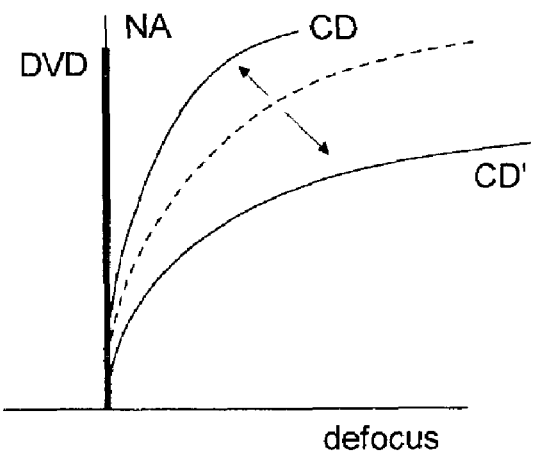
FIG. 5(a) shows illustratively how longitudinal spherical aberration is brought close to the aplanatic state by the optical path difference giving structure (optical path difference giving function) in the occasion wherein a refracting function and an optical path difference giving function are provided respectively on separate elements in the exclusive area for DVD that is common to the first-third inventions relating to the present invention.
FIG. 5(b) also shows illustratively how longitudinal spherical aberration is brought close to the aplanatic state by the optical path difference giving structure (optical path difference giving function) in the occasion wherein a refracting function and an optical path difference giving function are provided on one element in the exclusive area for DVD that is common to the first-third inventions relating to the present invention.
Figure 5:
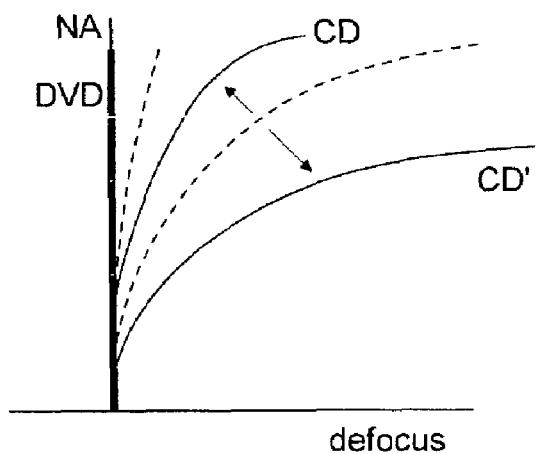

It is also possible to satisfy the difference of NA between DVD and CD without using the wavelength-selecting element. The refracting surface of lens 1 of exclusive area B may also be formed so that spherical aberration may be aplanatic for wavelength λ1 and spherical aberration may be overcorrected for wavelength λ2, as shown in FIG. 3(a). With respect to the phase difference plate of the exclusive area B, if the aforesaid prescribed wavelength is λ1, a light flux with wavelength λ1 is neither affected to be converged nor affected to be diverged by the phase difference plate, but is converged while keeping the aplanatic state. Though a light flux with wavelength λ2 is affected to be converged or affected to be diverged by the optical path difference giving function of the phase difference plate phase difference plate, the light flux which has passed through the exclusive area is not converged on the focus position, because aberration still remains. FIG. 5(a) shows the state of the foregoing, and each of CD and CD' shows a change of spherical aberration of final CD. When the lens and the phase difference plate are united integrally, it is preferable that the refracting surface of a virtual base aspheric surface before the integration is formed so that spherical aberration may be overcorrected for wavelength λ1 and spherical aberration may be overcorrected for wavelength λ2, as shown in FIG. 3(b). The optical path difference giving function makes the spherical aberration to be optimum for wavelength λ1 and makes the spherical aberration to be overcorrected for wavelength λ2, finally. This is shown in FIG. 5(b), and each of CD and CD' shows a change of spherical aberration of final CD. It is also possible to make the optical path difference giving function to be a diffractive structure.

To be concrete, in the case of the diffractive structure, it is formed so that an optical path length expressed by the following expression of Numeral 10, $$\phi(h) = \left( \sum_{i=1} C_{2i} h^{2i} \right) \times m \times \lambda = (C_2 h^2 + C_4 h^4 + C_6 h^6 + \cdots) \times m \times \lambda \quad \text{Numeral 10}$$

wherein m represents diffraction order, λ represents a wavelength to be used and Ci represents constants at least one of them satisfies Ci≠0, may be added to the incident light for the light passing through the ring-shaped zone whose vertical distance from the optical axis is h on the plane at a light source side of the lens. When obtaining diffraction effects sufficiently by the diffractive structure, if the number of ring-shaped zones is less, the diffractive effects are insufficient, while, if it is too many, on the contrary, accuracy is lowered and optical efficiency cannot be attained. The number of ring-shaped zones in the case of forming this diffractive structure is 7-100, and the number of 11-30 is preferable.

Further, the exclusive area B may also be composed only of a refracting surface. In that case, it is easy to manufacture optical elements.

Incidentally, design data of the lens realized by a single lens are shown in FIGS. 11-18. An exclusive area is represented by the refracting surface.

Figures 11A, 11B:
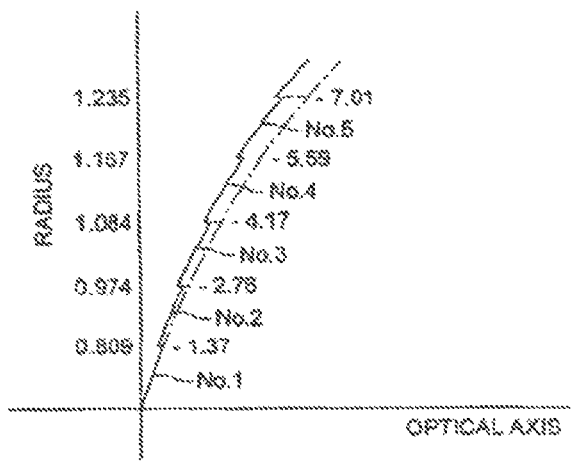
FIG. 11(a) shows an example of the first invention relating to the present invention, showing a radius of an inner circle and a radius of an outer circle of each ring-shaped zone and an amount of displacement in the optical axis direction in the objective lens wherein a refracting function and an optical path difference giving function are provided in one element.
FIG. 11(b) illustrates a configuration of ring-shaped zones that corresponds to ring-shaped zone nos. 1 to 5 of FIG. 11(a).
Figure 13:
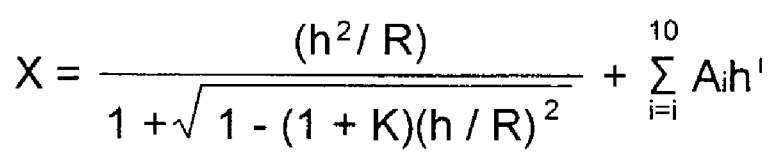

What is shown in FIG. 11 includes a radius of an inner circle, a radius of an outer circle and an amount of displacement in the optical axis direction of each ring-shaped zone. What is shown in FIG. 12 includes lens data, and an expression shown in FIG. 13 is an expression for a form of an aspheric surface. FIG. 14 shows aspheric surface data.

Effects of improvement in spherical aberration by the lens are shown in FIGS. 15-18.

Figure 15:
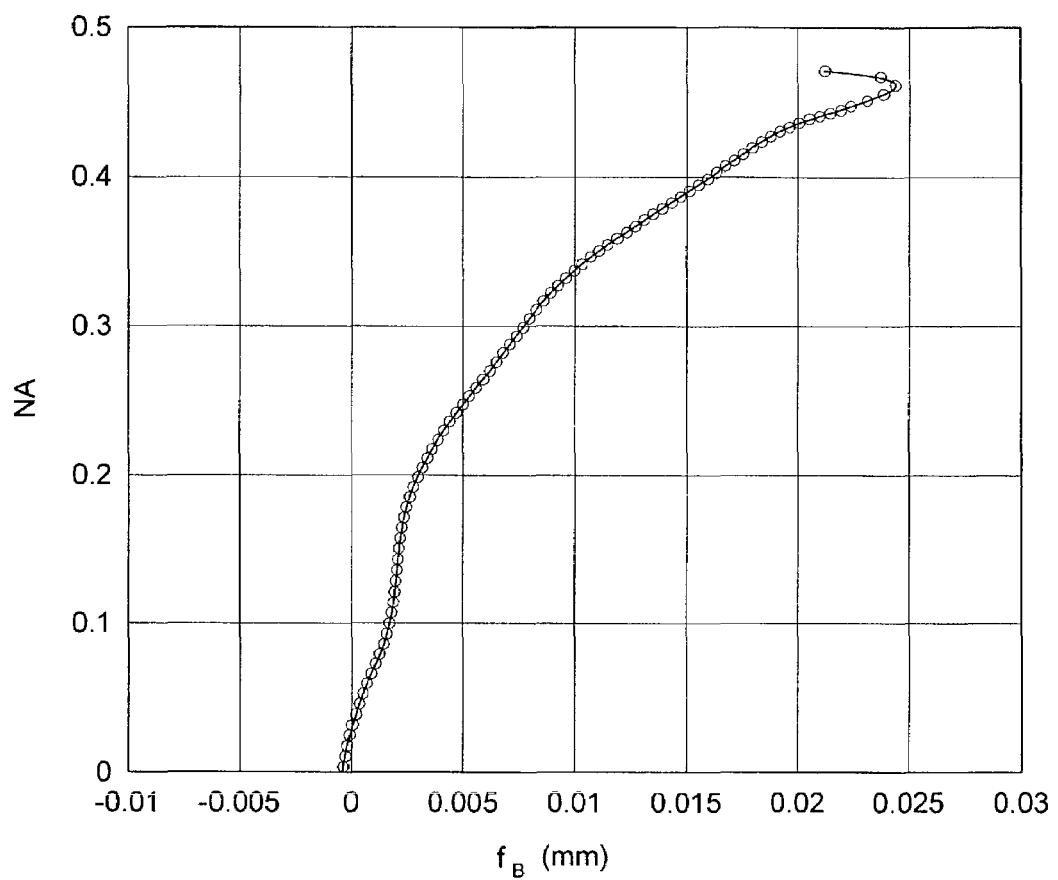
FIG. 15 shows an example of the first invention relating to the present invention, representing a diagram of longitudinal spherical aberration that is caused when a light flux with wavelength for CD in the common area for DVD and CD has passed the base aspheric surface (refracting surface).
Figure 16:
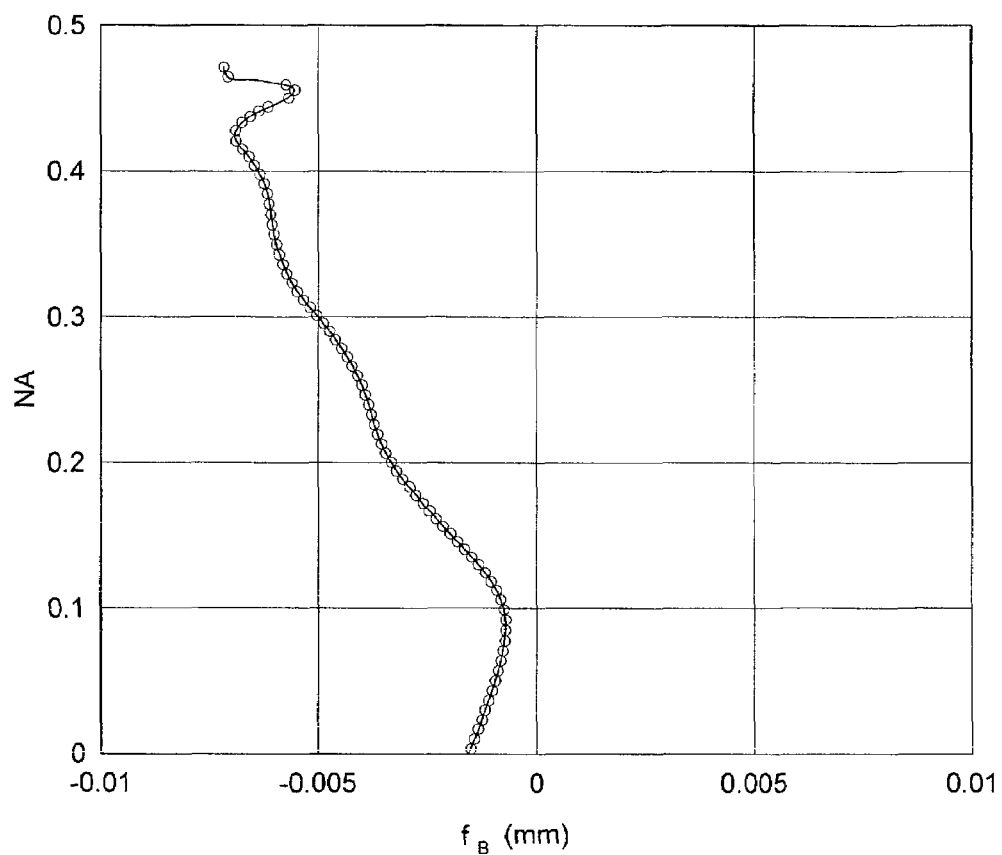
FIG. 16 shows an example of the first invention relating to the present invention, representing a diagram of longitudinal spherical aberration that is caused when a light flux with wavelength for DVD in the common area for DVD and CD has passed the base aspheric surface (refracting surface).

Each of FIGS. 15 and 16 shows spherical aberration of common area for DVD and CD for "a refracting function" or "an optical path difference giving structure" corresponding to lens 1. This is the same as one shown virtually in FIG. 2 (a), and longitudinal spherical aberration concerning CD is overcorrected, and longitudinal spherical aberration concerning DVD is under-corrected.

Figure 17:
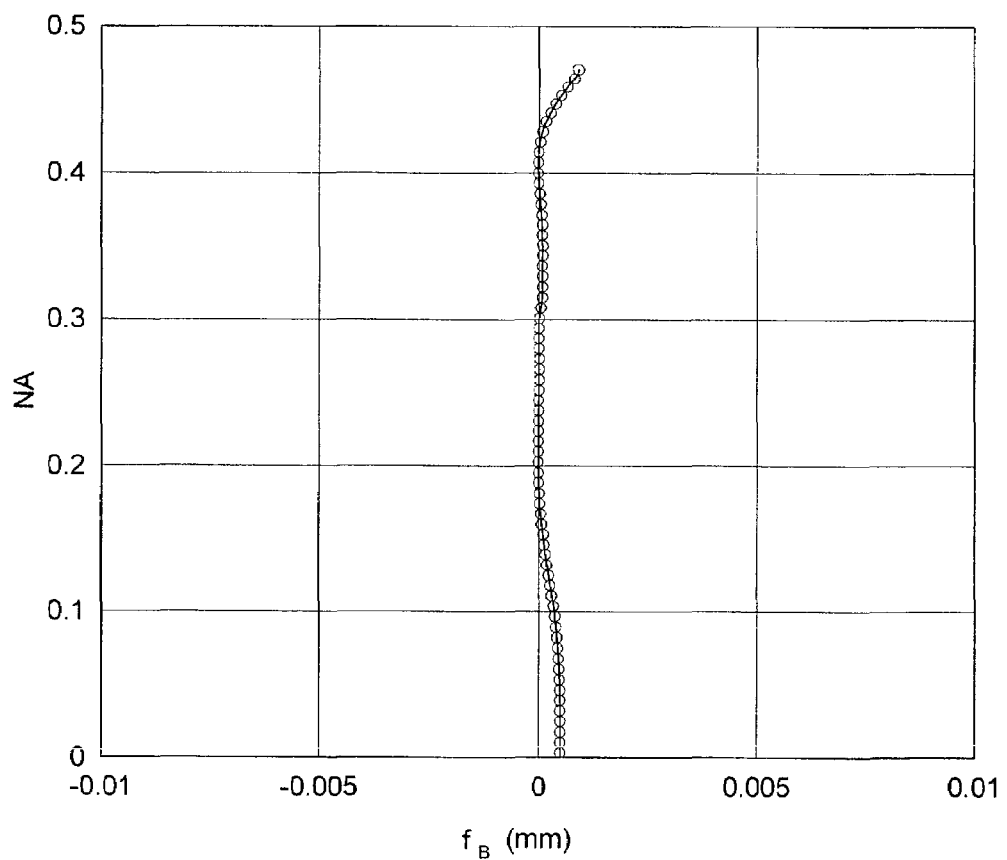
FIG. 17 shows an example of the first invention relating to the present invention, representing the state wherein a light flux with wavelength for CD in the area within an aperture for CD is brought to be close to the aplanatic state by the optical path difference giving structure (optical path difference giving function).
Figure 18:
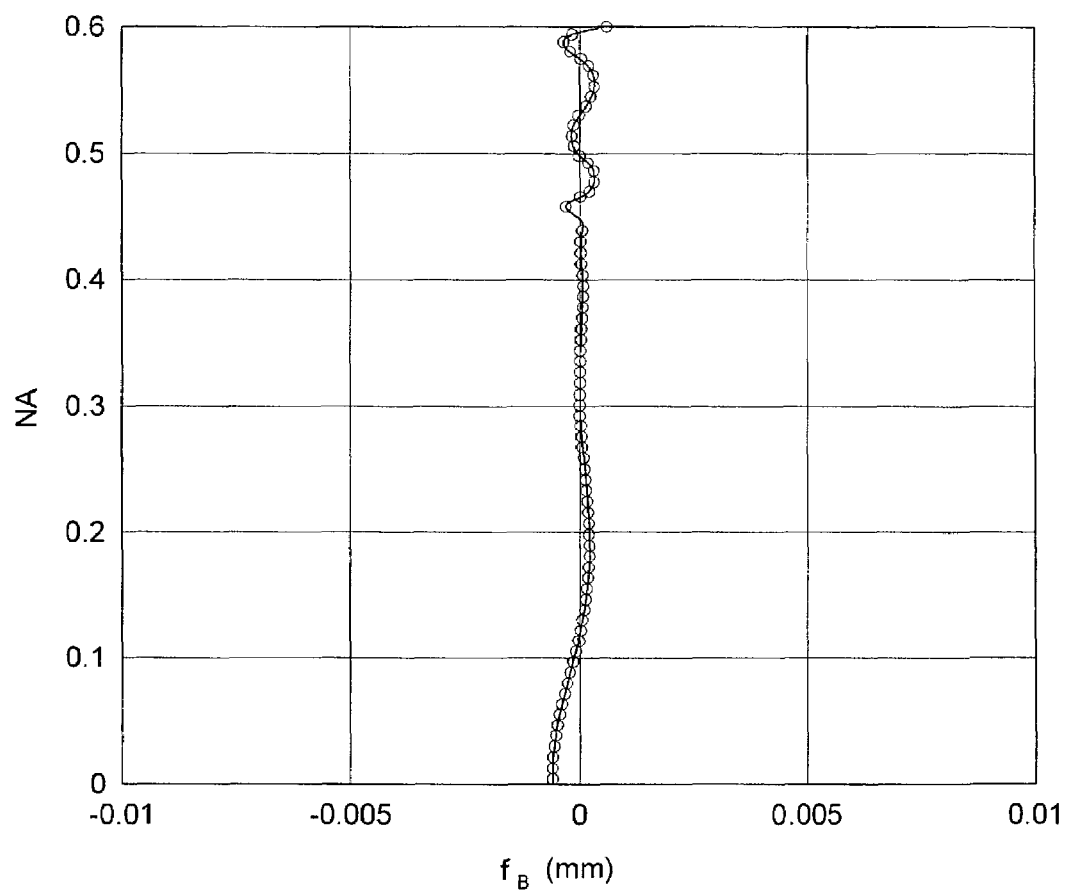
FIG. 18 shows an example of the first invention relating to the present invention, representing the state wherein a light flux with wavelength for DVD in the area within an aperture for DVD is brought to be close to the aplanatic state by the optical path difference giving structure (optical path difference giving function).
Figure 19A:
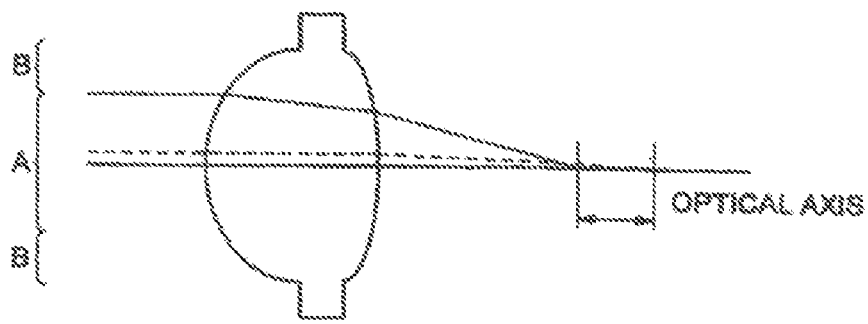
FIG. 19(a) shows an example of a paraxial ray and a light ray emitted from the first light source and passing a farthest point from the optical axis on a refracting surface region used for recording and/or reproducing information for both of the first and second optical information recording media.
Figure 19B:
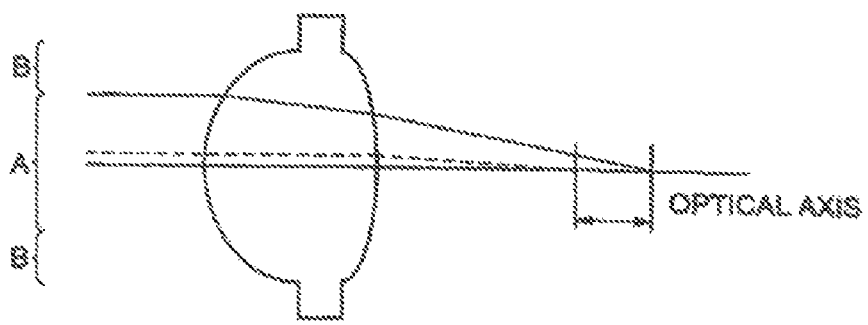
FIG. 19(b) also shows an example of a paraxial ray and a light ray emitted from the first light source and passing a farthest point from the optical axis on a refracting surface region used for recording and/or reproducing information for both of the first and second optical information recording media.

Spherical aberration of a light flux which has passed "an optical path difference giving function" or "an optical path difference giving structure" corresponding to phase difference plate 2, for common area for DVD and CD, on the other hand, is shown in each of FIGS. 17 and 18.

As is clear from the drawings, longitudinal spherical aberration concerning CD is under-corrected, and longitudinal spherical aberration concerning DVD is overcorrected, and aberration is improved and is optimum for both of them.

Second Embodiment

Figure 6:
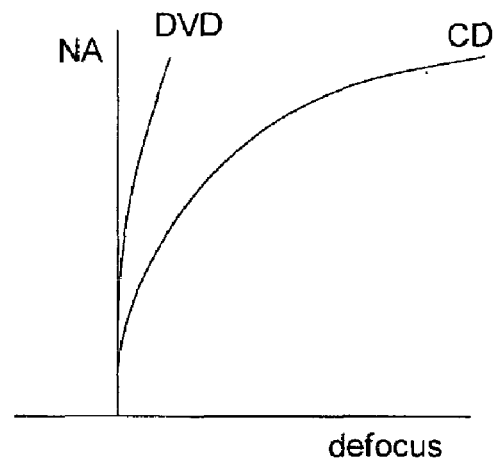
FIG. 6(a) shows illustratively longitudinal spherical aberration of the base aspheric surface (refracting surface) in the occasion wherein a refracting function and an optical path difference giving function are provided respectively on separate elements in a common area for DVD and CD of the second invention relating to the present invention.
FIG. 6(b) also shows illustratively longitudinal spherical aberration of the base aspheric surface (refracting surface) in the occasion wherein a refracting function and an optical path difference giving function are provided on one element in a common area for DVD and CD of the second invention relating to the present invention.
Figure 6:
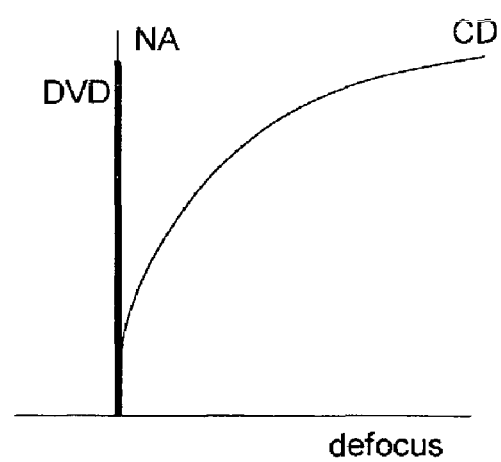
Figure 7:
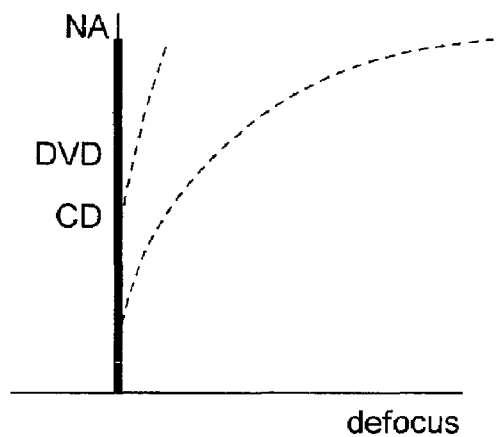
FIG. 7(a) shows illustratively how longitudinal spherical aberration is brought close to the aplanatic state by the optical path difference giving structure (optical path difference giving function) in the occasion wherein a refracting function and an optical path difference giving function are provided respectively on separate elements in the common area for DVD and CD of the second invention relating to the present invention.
FIG. 7(b) also shows illustratively how longitudinal spherical aberration is brought close to the aplanatic state by the optical path difference giving structure (optical path difference giving function) in the occasion wherein a refracting function and an optical path difference giving function are provided on one element for the common area for DVD and CD in the common area for DVD and CD of the second invention relating to the present invention.
Figure 7:
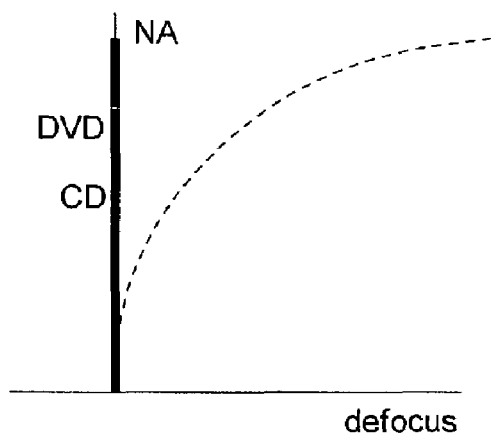
Figure 8:
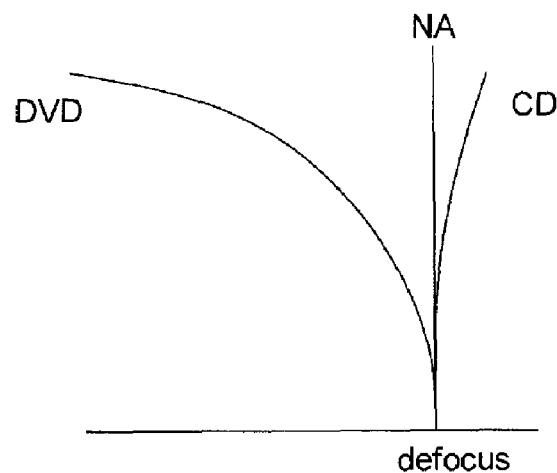
FIG. 8(a) shows illustratively longitudinal spherical aberration of the base aspheric surface (refracting surface) in the occasion wherein a refracting function and an optical path difference giving function are provided respectively on separate elements in a common area for DVD and CD of the third invention relating to the present invention.
FIG. 8(b) also shows illustratively longitudinal spherical aberration of the base aspheric surface (refracting surface) in the occasion wherein a refracting function and an optical path difference giving function are provided on one element in a common area for DVD and CD of the third invention relating to the present invention.
Figure 8:
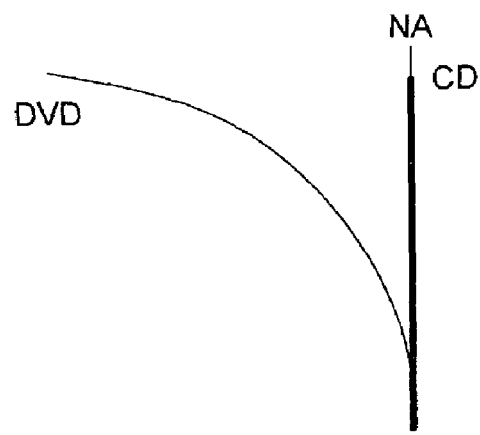
Figure 9:
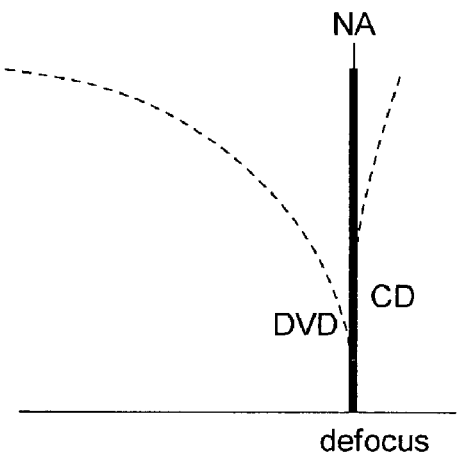
FIG. 9(a) shows illustratively how longitudinal spherical aberration is brought close to the aplanatic state by the optical path difference giving structure (optical path difference giving function) in the occasion wherein a refracting function and an optical path difference giving function are provided respectively on separate elements in the common area for DVD and CD of the third invention relating to the present invention.
FIG. 9(b) also shows illustratively how longitudinal spherical aberration is brought close to the aplanatic state by the optical path difference giving structure (optical path difference giving function) in the occasion wherein a refracting function and an optical path difference giving function are provided on one element for the common area for DVD and CD in the common area for DVD and CD of the third invention relating to the present invention.
Figure 9:
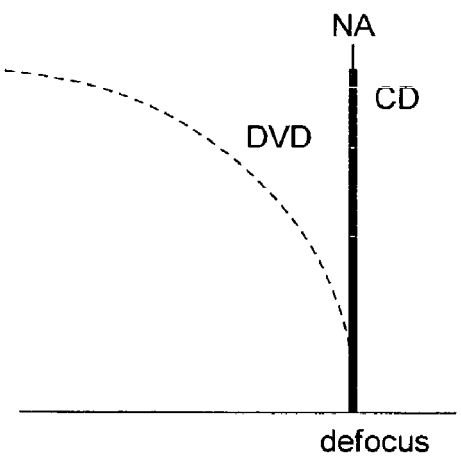

An outline of optical functions of the second invention will be explained next, referring to FIG. 1 and FIGS. 6 and 7.

This is one relating to the invention in Item 2 or Item 26. For the sake of explanation, the invention is divided into a separate type and an integration type.

The separate type will be explained.

Since the basic structure for lens 1, phase difference plate 2 and an unillustrated light source is the same as that in the first invention, the explanation thereof will be omitted. In the present example, however, optical functions of lens 1 and phase difference plate 2 are partially different.

Lens 1 in the second invention is formed so that spherical aberration may be aplanatic for a light flux with wavelength λ1 which has passed through common area A as shown in FIG. 6(a). In this case, spherical aberration for a light flux with wavelength λ2 is naturally overcorrected, because of a difference of wavelength λ1<λ2 and protective base board thickness t1<t2.

Even in the second invention, an amount of a step of phase difference plate 2 is set to the length which generates an optical path difference that is almost a multiple of an integer of a prescribed wavelength, and causes no wave-front deviation, and in this case, the prescribed wavelength is set to λ1.

Since a light flux with wavelength λ1 among light fluxes which have passed through the phase difference plate is neither affected to be converged nor affected to be diverged, if spherical aberration is optimum on the refracting surface when the light flux with wavelength λ1 enters the refracting surface, spherical aberration is also optimum for the light flux which has passed through the phase difference plate and the objective lens. The light flux with wavelength λ2 is made to be of aplanatic by effects of diverging actions by the phase difference plate and of the thickness of the phase difference plate. The foregoing is shown in FIG. 7(a).

Next, there will be explained an occasion wherein the phase difference plate and the objective lens are united integrally.

The virtual base aspheric surface is formed so that spherical aberration may be overcorrected for the light flux with wavelength λ1 as shown in FIG. 6(b). In that case, spherical aberration is naturally overcorrected for the light flux with wavelength λ2. The light flux with wavelength λ1 is neither affected to be converged, nor affected to be diverged by the optical path difference giving function. However, if the optical path difference giving function is added, rays of light entering the objective lens at the same height from the optical axis intersect with the optical axis on the under side, with a distance in the substance increased by a thickness of the phase difference plate, resulting in the aplanatic state. On the other hand, the light flux with wavelength λ2 for which the spherical aberration was made to be overcorrected originally by the aspheric surface is made to be aplanatic by the effect of a thickness of the phase difference plate and the optical path difference giving function added. It is possible to obtain appropriate spherical aberration for the light flux with either wavelength. This is shown in FIG. 7(b).

For both the integration type and the separate type, there is specified a form of a refracting surface which generates the aplanatic state for both wavelength λ1 and wavelength λ2 when a prescribed wavelength is λ1. It is preferable to design so that a ray of light with wavelength λ1 that passes through a boundary of the common area may intersect in an area within 0.020 mm from the position where a paraxial ray intersects with the optical axis.

Even in the present invention, an optical path difference giving function or an optical path difference giving structure may be formed by the diffractive structure, as in the first invention. In that case, a light flux emitted from the second light source for which the spherical aberration is made to be overcorrected by the refracting function is arranged to be aplanatic by the diffractive structure.

Exclusive area B is exactly the same as that in the first invention.

Third Embodiment

An outline of optical functions of the third invention will be explained further, referring to FIGS. 1-8 and FIG. 9.

This is related to the invention of Item 3 or Item 27.

Since the basic structure for lens 1, phase difference plate 2 and an unillustrated light source is the same as that in the first invention and the second invention, the explanation thereof will be omitted. In the present example, however, optical functions of lens 1 and phase difference plate 2 are partially different. For the sake of explanation, the invention is divided into a separate type and an integration type for description.

The separate type will be explained.

Directly speaking, this is opposite to the second invention, and lens 1 in the third invention makes spherical aberration to be under-corrected for the light flux with wavelength λ1 that has passed the common area A, as shown in FIG. 8(a), and a diffracting interface that makes spherical aberration to be aplanatic is formed on the lens 1.

Even in the third invention, an amount of a step of phase difference plate 2 is set to the length which generates an optical path difference that is almost a multiple of an integer of a prescribed wavelength, and causes no wave-front deviation, and in this case, the prescribed wavelength is set to λ2.

Since a light flux with wavelength λ2 which has passed through the phase difference plate is neither affected to be converged nor affected to be diverged, spherical aberration is made to be optimum for the light flux which has passed through the phase difference plate and the objective lens. On the other hand, the light flux with wavelength λ1 is made to be of aplanatic by effects of diverging actions by the phase difference plate and of the thickness of the phase difference plate. This is shown in FIG. 9(a).

Next, the integration type will be explained. A virtual base aspheric surface is formed so that spherical aberration for a light flux with wavelength λ1 may be under-corrected as shown in FIG. 8(b). Then, spherical aberration for a light flux with wavelength λ2 is made to be overcorrected. The light flux with wavelength λ2 is neither affected to be converged, nor affected to be diverged by the optical path difference giving function. However, if the optical path difference giving function is added, rays of light entering the objective lens at the same height from the optical axis intersect with the optical axis on the under side, with a distance in the substance increased by a thickness of the phase difference plate, resulting in the aplanatic state. On the other hand, the light flux with wavelength λ1 for which the spherical aberration was made to be under-corrected originally by the aspheric surface is made to be aplanatic by the effect of a thickness of the phase difference plate and the optical path difference giving function added. It is possible to obtain appropriate spherical aberration for the light flux with either wavelength. This is shown in FIG. 9(b). There is specified a form of a refracting surface which generates the aplanatic state for both wavelength λ1 and wavelength λ2 when a prescribed wavelength is λ2. It is preferable to design so that a ray of light with wavelength λ1 that passes through a boundary of the common area may intersect in an area within 0.030 mm from the position where a paraxial ray intersects with the optical axis.

In the case of the present invention, when an optical path difference giving function or an optical path difference giving structure is formed by the diffractive structure, a light flux emitted from the first light source for which the spherical aberration is made to be under-corrected by the refracting function is arranged to be aplanatic by the diffractive structure.

Next, the invention of Item 49 will be explained.

The phase difference plate 2 is split into plural ring-shaped zones whose centers are on the optical axis in the same way as in the first-third inventions, and adjoining ring-shaped zones are formed to be displaced in the optical axis direction so that an optical path difference that is a multiple of an integer of prescribed wavelength λs may be generated.

When the refracting surface of lens 1 is greatly different on the area of ring-shaped zones whose centers are on the optical axis, an area in a phase difference plate corresponding to each refracting surface is formed so that an optical path length of a ray of light may be longer as the ray of light is farther from the optical axis direction. Therefore, spherical aberration and wave-front aberration are corrected as in the first invention. However, in the entire area, it does not necessarily happen that the optical path length of a ray of light is longer as the ray of light is farther from the optical axis direction.

With respect to the number of ring-shaped zones of the phase difference plate, when it is too small or when it is too large, there is a harmful influence, and the number ranging from 7 to 100 is preferable.

In the invention of Item 1 or Item 25, spherical aberrations of a common area caused by a base aspheric surface (refracting surface) each was under-corrected for λ1 and was over-corrected for λ2 were made to be aplanatic by the optical path difference giving function (optical path difference giving structure) which generates the optical path that is almost a multiple of an integer of prescribed wavelength λs (λ1<λs<λ2), and thereby, it is possible to obtain an excellent wave-front in the common area.

In the invention of Item 2 or Item 26, spherical aberrations of a common area caused by a base aspheric surface (refracting surface) each was overcorrected or optimum for λ1 and was overcorrected for λ2 were made to be aplanatic by the optical path difference giving function (optical path difference giving structure) which generates the optical path that is almost a multiple of an integer of prescribed wavelength λs (λ1=λs), and thereby, it is possible to obtain an excellent wave-front in the common area.

In the invention of Item 3 or Item 27, spherical aberrations of a common area caused by a base aspheric surface (refracting surface) each was under-corrected for λ1 and was overcorrected or optimum for λ2 were made to be aplanatic by the optical path difference giving function (optical path difference giving structure) which generates the optical path that is almost a multiple of an integer of prescribed wavelength λs (λs=λ2), and thereby, it is possible to obtain an excellent wave-front in the common area.

In the inventions of Item 4 and Item 28, the light flux subjected to refracting actions and then is subjected to optical path difference giving actions is made to be of the optimum aberration state, and thereby, it is possible to obtain an excellent wave-front in the common area.

In the inventions of Item 5 and Item 29, a ray of light with wavelength λ1 passing through a boundary of the common area is made to intersect by the refracting function in the area within 0.013 mm from the position where the paraxial ray intersects with the optical axis, and thereby, the aplanatic state is generated for both wavelength λ1 and wavelength λ2 when the optical path difference giving function is added.

In the inventions of Item 6 and Item 30, a ray of light with wavelength λ1 passing through a boundary of the common area is made to intersect by the refracting function in the area within 0.020 mm from the position where the paraxial ray intersects with the optical axis, and thereby, the aplanatic state is generated for both wavelength λ1 and wavelength λ2 when the optical path difference giving function is added.

In the inventions of Item 7 and Item 31, a ray of light with wavelength λ1 passing through a boundary of the common area is made to intersect by the refracting function in the area within 0.030 mm from the position where the paraxial ray intersects with the optical axis, and thereby, the aplanatic state is generated for both wavelength λ1 and wavelength λ2 when the optical path difference giving function is added.

In the inventions of Item 8 and Item 32, a base aspheric surface (refracting surface) and an optical path difference giving function (optical path difference giving structure) are formed separately, and thereby, it is easy to form a complicated form for each of them, which is an advantage.

In the inventions of Item 9 and Item 33, a base aspheric surface (refracting surface) and an optical path difference giving function (optical path difference giving structure) are provided to one element, and thereby, it does not have trouble in heightening accuracy for positioning, and it is possible to obtain an optical element of an optical pickup device which can be handled easily by a single element.

In the inventions of Item 10 and Item 34, the number of ring-shaped zones having the optical path difference giving structure (optical path difference giving function) is 3-7, and thereby, formation of the optical system is easy and aberration efficiency can be attained.

In the inventions of Item 11 and Item 35, the optical path difference giving function (the optical path difference giving structure) is given by the diffractive structure, and thereby, an effect of diffracted light can be obtained, and light-converging efficiency for the spot is raised.

In the inventions of Item 12 and Item 36, the inventions of Item 13 and Item 37, and inventions of Item 14 and Item 38, the diffractive structure generates the aplanatic state, and thereby, it is possible to provide an optical element wherein no aberration is caused for both DVD and CD, and light-converging efficiency for the spot is high.

In the inventions of Item 15 and Item 39, efficiency for the light passing through the common area for DVD and CD to contribute to the light-converged spot is high.

In the inventions of Item 16 and Item 40 and inventions of Item 17 and Item 41, formation of the optical system is easy because the number of ring-shaped zones is appropriate for obtaining an effect of diffraction and the number of ring-shaped zones is not excessive.

In the inventions of Item 18 and Item 42, formation of the optical system is easy because a peripheral area is composed of a refracting surface.

In the inventions of Item 19 and Item 43, a peripheral area (exclusive area used for only DVD) is made to be a refractive interface which makes spherical aberration to be optimum for a wavelength for DVD and makes spherical aberration to be overcorrected for a wavelength for CD, and an optical path difference giving function (optical path difference giving structure) is provided on the peripheral area separately from the common area, and therefore, a wavelength for CD is subjected to actions to generate the aplanatic state.

In the inventions of Item 20 and Item 44, efficiency for the light passing through the exclusive area for DVD to contribute to the light-converged spot is high, because the optical path difference giving function on the peripheral area is of the diffractive structure.

In the inventions of Item 21 and Item 45, the diffractive structure generates the aplanatic state, and therefore, there is no aberration for the wavelength for CD, and it is possible to provide an optical element wherein light-converging efficiency for the spot is high.

In the inventions of Item 22 and Item 46, efficiency for the light passing through the common area for DVD and CD to contribute to the light-converged spot is high.

In the inventions of Item 23 and Item 47 and inventions of Item 24 and Item 48, formation of the optical system is easy because the number of ring-shaped zones is appropriate for obtaining an effect of diffraction and the number of ring-shaped zones is not excessive.

In the invention of Item 49, both spherical aberration and wave-front aberration are corrected because there is formed in the area in the phase difference plate corresponding to each refracting surface so that an optical path length of light may be longer as the light is farther away from the optical axis direction.

In the invention of Item 50, aberration is corrected properly because prescribed wavelength λs satisfies the relationship of λ1<λs<λ2.

In the inventions of Item 51, formation of the optical system is easy, because the number of ring-shaped zones is appropriate and it is not excessive.

In the inventions of Item 52, it is possible to obtain an optical element of an optical pickup device which causes no aberration and has an excellent spot efficiency.

What is claimed is:

1. An optical element for use in an optical pickup apparatus in which information recording and/or reproducing can be conducted by converging a light flux having a wavelength λ1 from a first light source through a protective substrate having a thickness t1 on an information recording medium of a first optical information recording medium or can be conducted by converging a light flux having a wavelength λ2 (λ1<λ2)

from a second light source through a protective substrate having a thickness t2 (t1<t2) on an information recording medium of a second optical information recording medium, the optical element comprising:

an optical functional surface including a common area used for conducting information recording and/or reproducing for both of the first optical information recording medium and the second optical information recording medium, and the common area comprising an aspheric surface to cause a refractive function such that a spherical aberration becomes under corrected on the first information medium and a spherical aberration becomes over corrected on the second information medium, wherein the aspheric surface is separated around the center of an optical axis to form plural ring-shaped zones and wherein each aspheric surface of neighboring ring-shaped zones of the plural ring-shaped zones is displaced to each other in a direction of an optical axis so as to cause an optical path difference obtained by multiplying a predetermined wavelength $\lambda s$ ($\lambda 1 < \lambda s < \lambda 2$) with almost an integer.

2. The optical element of claim 1, wherein a displacement between the ring-shaped zones makes both of the spherical aberration on the first optical information recording medium and the spherical aberration on the second optical information recording medium to be optimum.

3. The optical system of claim 1, wherein a light ray, which is emitted from the first light source and passes a point positioned farthest from the optical axis on a refracting surface region used for conducting information recording and/or reproducing for both of the first optical information recording medium and the second optical information recording medium, is adapted by the aspheric surface so as to intersect with the optical axis in a region located within 0.013 mm from a position Pr at which a paraxial ray intersects with the optical axis.

4. The optical element of claim 1, wherein the number of the ring-shaped zones in the optical path difference providing structure is 3 to 7.

5. The optical element of claim 1, wherein the optical functional surface includes a peripheral region which is located on a peripheral side of the common area and is used for conducting information recording and/or reproducing for the first optical information recording medium, and wherein the peripheral region is formed by a refractive surface.

6. The optical element of claim 1, wherein the optical functional surface includes a peripheral region which is located on a peripheral side of the common area and is used for conducting information recording and/or reproducing for the first optical information recording medium, and wherein the peripheral region has a second refractive function to make the spherical aberration on the first optical information recording medium to over or optimum and the peripheral region has a second optical path difference providing structure in which plural ring-shapes zones are separated around the center of an optical axis, neighboring ring-shaped zones are displaced to each other in a direction of an optical axis so as to cause an optical path difference obtained by multiplying a predetermined wavelength $\lambda 1$ with almost an integer, and the plural ring-shaped zones are formed in such a way that a optical path length of a light ray becomes gradually longer toward the outer side of the plural ring-shaped zones.

7. The optical element of claim 1, wherein the predetermined wavelength $\lambda s$ is a middle wavelength defined by the formula $\lambda 1 + (\lambda 2 - \lambda 1)/2$.

* * * * *